(12) United States Patent
Troy et al.

(10) Patent No.: US 9,646,187 B2
(45) Date of Patent: May 9, 2017

(54) SYSTEMS AND METHODS FOR AUTOMATED DEVICE PAIRING

(71) Applicant: The Boeing Company, Huntington Beach, CA (US)

(72) Inventors: James J. Troy, Issaquah, WA (US); Christopher Esposito, Issaquah, WA (US); Vladimir Karakusevic, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 117 days.

(21) Appl. No.: 14/814,647

(22) Filed: Jul. 31, 2015

(65) Prior Publication Data
US 2017/0032159 A1    Feb. 2, 2017

(51) Int. Cl.
*H04Q 5/22*    (2006.01)
*G06K 7/10*    (2006.01)

(52) U.S. Cl.
CPC ................ *G06K 7/10366* (2013.01)

(58) Field of Classification Search
CPC .................................... G06K 7/10366
USPC ......................................... 340/10.5
See application file for complete search history.

(56) References Cited

U.S. PATENT DOCUMENTS

| | | | |
|---|---|---|---|
| 8,421,604 B2 * | 4/2013 | Bellows | G06K 7/0008 340/12.26 |
| 2006/0280149 A1 * | 12/2006 | Kuhl | G06K 7/0008 370/338 |
| 2008/0100450 A1 * | 5/2008 | Ayyagari | B64D 25/18 340/572.7 |
| 2010/0060050 A1 * | 3/2010 | Muirhead | B64D 11/00152 297/217.4 |
| 2012/0191297 A1 | 7/2012 | Callahan et al. | |
| 2013/0197746 A1 * | 8/2013 | Glueck | G06F 17/00 701/34.4 |
| 2014/0210598 A1 | 7/2014 | Mitchell et al. | |

OTHER PUBLICATIONS

U.S. Appl. No. 14/699,713, filed Apr. 29, 2015.

* cited by examiner

*Primary Examiner* — Tanmay Shah
(74) *Attorney, Agent, or Firm* — Armstrong Teasdale LLP (57) ABSTRACT

A system is provided that includes a scanner movable relative to seat units and controllable devices each having RFID tags, the scanner configured to obtain a continuum of received signals, a distance sensor configured to determine a relative position of the scanner, a filter configured to disregard outliers and smooth the continuum into respective sets of received signal data, wherein each set of received signal data includes data points having a unique ID and a received signal strength, and wherein a relative time and a relative position are determined for each data point, and a processor configured to determine a relative location of each RFID tag, based on the relative position associated with maximum received signal strength within the set of received signal data, and generate a data file including pairings of seat units and associated controllable devices based on similar relative positions of RFID tags.

20 Claims, 10 Drawing Sheets

SYSTEMS AND METHODS FOR AUTOMATED DEVICE PAIRING

BACKGROUND

The field of the disclosure relates generally to electronically pairing devices or objects, and, more particularly, relates to a scanning system for quickly and efficiently pairing multiple devices.

Aircraft cabins may include a number of output devices (e.g., lights, vents, entertainment systems, etc.) that are remotely controllable by a control panel, or controller, located, for example, on or near a user's seat. In at least some known systems, custom wire harnesses directly connect a controller to an output device. However, the custom wire harnesses are typically heavy and inflexible. Accordingly, in at least some other known systems, controller and output devices are in wired or wireless communication with one another, and each output device has a unique network address. The output device responds only to commands directed to the unique network address. This reduces the amount of wiring and allows output devices to be moved relative to controller, but requires the controller to be associated with the unique network address of the device being controlled.

Current systems and methods for pairing controllers and output devices are somewhat inefficient and error prone. For example, at least one method for pairing devices over a network requires the devices to first be connected to the on-board network, and requires detailed location information as well as a learning mode for entering unique IDs for each output device to be controlled. The location information and unique IDs are manually entered for storage in a table. This method has multiple possible points of failure, include the initial acquisition of location information and unique IDs, and manual entry of data into the table (which is time consuming, tedious, and often involves transcription errors). Further, in at least some known systems, a user operates a hand-held device to pair each controller and output device. However, such methods are not automated (relying on the user to identify which controller should be paired with which output device), and do not have the capability to continuously receive and update position information for detectable controllers and output devices.

BRIEF DESCRIPTION

In one aspect, a system for electronically pairing a plurality of seat units with a plurality of controllable devices in an aircraft is provided. The system includes a scanner movable relative to a plurality of seat units and a plurality of controllable devices each having RFID tags, the scanner configured to continuously scan and obtain a continuum of received signals from the RFID tags, a distance sensor configured to determine a relative position of the scanner over time as the scanner is moved, a filter configured to disregard outliers and smooth the continuum of received signals into respective sets of received signal data for each RFID tag, based on a unique ID in each received signal associated with each RFID tag, wherein each set of received signal data includes data points having the unique ID and a received signal strength, and wherein a relative time and a relative position are determined for each data point, and a processor configured to determine a relative location of each RFID tag, based on the relative position associated with a maximum received signal strength within the set of received signal data for each RFID tag, and generate a data file including pairings of seat units and associated controllable devices based on similar relative positions of RFID tags associated with each seat unit and each controllable device, the data file generated to enable respective seat units to operate associated controllable devices.

In another aspect, a method for electronically pairing a plurality of seat units with a plurality of controllable devices in an aircraft is provided. The method includes moving a scanner relative to a plurality of seat units and a plurality of controllable devices each having RFID tags to continuously scan and obtain a continuum of received signals from the RFID tags, determining a relative position of the scanner over time as the scanner is moved, filtering the continuum of received signals into respective sets of received signal data for each RFID tag, based on a unique ID in each received signal associated with each RFID tag, wherein each set of received signal data includes data points having the unique ID and a received signal strength, and wherein a relative time and a relative position are determined for each data point, determining a relative location of each RFID tag, based on the relative position associated with a maximum received signal strength within the set of received signal data for each RFID tag, and generating a data file including pairings of seat units and associated controllable devices based on similar relative positions of RFID tags associated with each seat unit and each controllable device, the data file generated to enable respective seat units to operate associated controllable devices.

In yet another aspect, a scanner for electronically pairing a plurality of seat units with a plurality of controllable devices in an aircraft is provided. The scanner is configured to continuously scan and obtain a continuum of received signals from RFID tags associated with a plurality of seat units and a plurality of controllable devices as the scanner is moved through the aircraft, determine a relative position of the scanner over time as the scanner is moved, filter the continuum of received signals into respective sets of received signal data for each RFID tag, based on a unique ID in each received signal associated with each RFID tag, wherein each set of received signal data includes data points having the unique ID and a received signal strength, and wherein a relative time and a relative position are determined for each data point, determine a relative location of each RFID tag, based on the relative position associated with a maximum received signal strength within the set of received signal data for each RFID tag, and generate a data file including pairings of seat units and associated controllable devices based on similar relative positions of RFID tags associated with each seat unit and each controllable device, the data file generated to enable respective seat units to operate associated controllable devices.

DETAILED DESCRIPTION

The systems and methods described herein facilitate using long range and/or directional RFID equipment to read unique IDs of RFID-tagged control units and objects (also referred to as controllable devices or associated devices) as a scanning system is moved through an environment (e.g., an airplane cabin) without having to stop at each control unit or object location to acquire unique ID data from that control unit/object. Spatial information and temporal information associated with signal strengths of the control units and objects are acquired as the scanning system is moved through the environment. The scanning system may be a wearable system that a user carries or straps on (like a backpack), or may be moved around on a cart. In some implementations, robotic platforms may also be used to carry the scanning system on a planned route through the environment. Once complete, a pairing list of control units and associated objects is downloaded to a system processor, as described herein.

The data acquired during the pairing process (or in a separate scanning process) may also be used to provide a location of the control units and objects in a map for 3D localization. This may be a continuously updated process that gives a position (e.g., of the scanning system) relative to the RFID-tagged control units and objects, which may facilitate 3D visualization methods and/or robotic navigation.

The implementations described herein may also be part of a larger overall process that also uses a hand-held approach, such as that disclosed is U.S. patent application Ser. No. 14/699,713, filed Apr. 29, 2015, which is hereby incorporated by reference in its entirety. The hand-held approach may be more reliable, but the automated approach described herein will likely be faster. Accordingly, the two approaches may be used together in a comprehensive application where the automated approach is performed first, and any missed and/or incorrect data is resolved using the hand-held approach.

Figure 1:
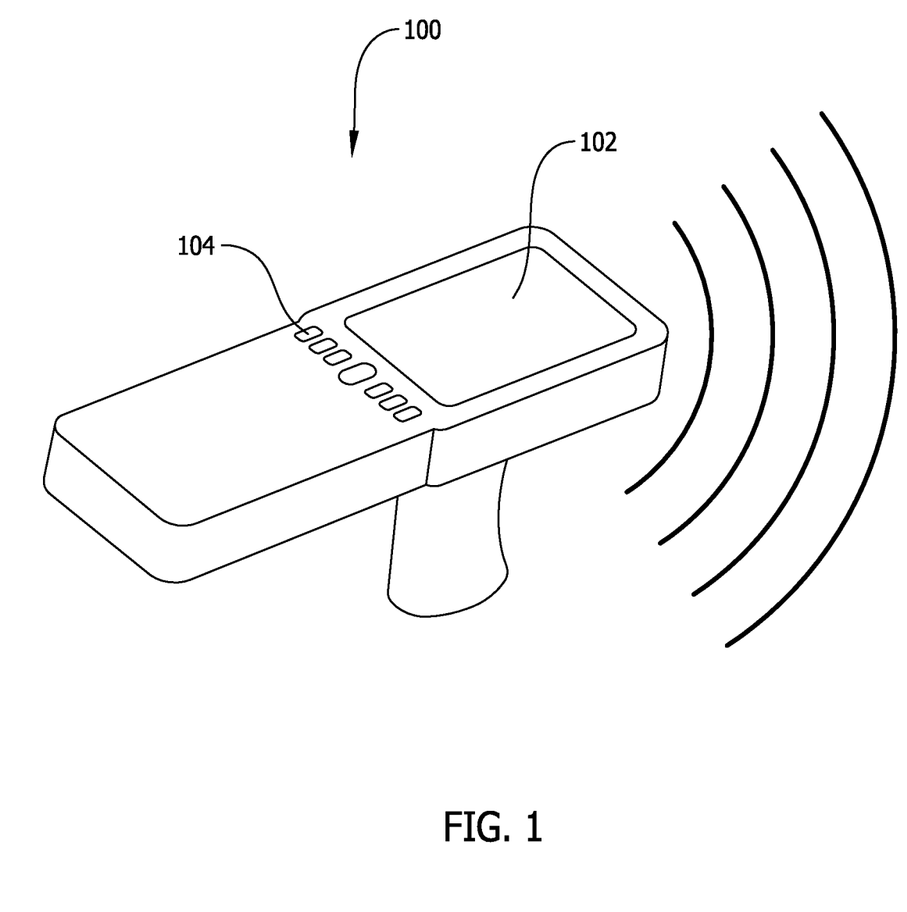
FIG. 1 is a schematic view of an example scanner.

FIG. 1 is a schematic view of an example scanner 100. Scanner 100 is radio-frequency identification (RFID) scanner in the example implementation. Alternatively, scanner 100 may be any other type of scanning device that enables scanner 100 to function as described herein. Scanner 100 includes a display 102 for displaying information to a user, and at least one input interface 104 (e.g., a button, a touch-screen interface, voice recognition, etc.) for receiving input from the user. Although scanner 100 is shown as a portable, hand held scanner, alternatively, scanner may be any type of scanning device. For example, scanner 100 may be included in a wearable system that a user carries or straps on (like a backpack), or scanner 100 may be moved around on a cart.

Scanner 100 is used to implement a pairing process that takes advantage of relative spatial associations and device information contained in (or derived from) machine readable tags on devices in order to differentiate devices. That is, in the example implementation, devices to be paired each include a passive RFID tag that is readable by scanner 100. For example, on an aircraft, scanner 100 may be used to pair a control unit on a seat with an associated device. Associated devices may include, for example, an overhead light, an entertainment system (e.g., a television), a vent, an electronic window shade, and an attendant notification system (e.g., a stewardess call button).

As described below, scanner 100 is used in a spatial/temporal process to identify passive RFID tags and determine the relative locations of the tags. This process enables pairing tags for control applications, as well as position tracking and localization for navigation applications, such as 3D visualization applications. For example, scanner 100 may be used to automatically create a map of RFID tag locations within the aircraft that specifies relative positions of detected RFID tags.

Efficient device pairing as well as continuous position tracking in real-world conditions is made possible using the systems and methods described herein. In general, the process involves moving scanner 100 through an environment to gather signal strengths of ID data from multiple RFID tags corresponding to control units associated with seats in different rows of an aircraft. Once sufficient data has been acquired, a differentiation process can determine the position of scanner 100 relative to the seats. Further, if the location of at least one seat is known (i.e., in airplane coordinates), then the position of scanner 100 may be converted into airplane coordinates, which may be useful in other applications.

Although knowledge of a seating pattern may be used with RFID signal strength data to determine which signal belongs with which seat in ideal conditions, unfortunately, in real-world situations, disturbances such as signal noise and multi-path reflections may make it difficult to reliability determine which seat is associated with which signal. The implementations described herein address this problem by collecting a series of data points while scanner 100 is moving through the environment. Further, a filtering process also facilitates identifying which signal belongs with which seat. Recording both spatial data (i.e., a one-dimensional distance) and temporal data (i.e., a time stamp) for each measured signal strength data point, as well as the identification data (e.g., the RFID tag's unique identifier) allows for tag location identification, even under noisy conditions, as described herein. Based on the recorded distance and other acquired data, a three-dimensional position of the RFID tag and/or scanner 100 may be determined. Once identified, the association between the seat and signal may be maintained, and location estimates may be generated, even when multiple signals overlap.

Figure 2:
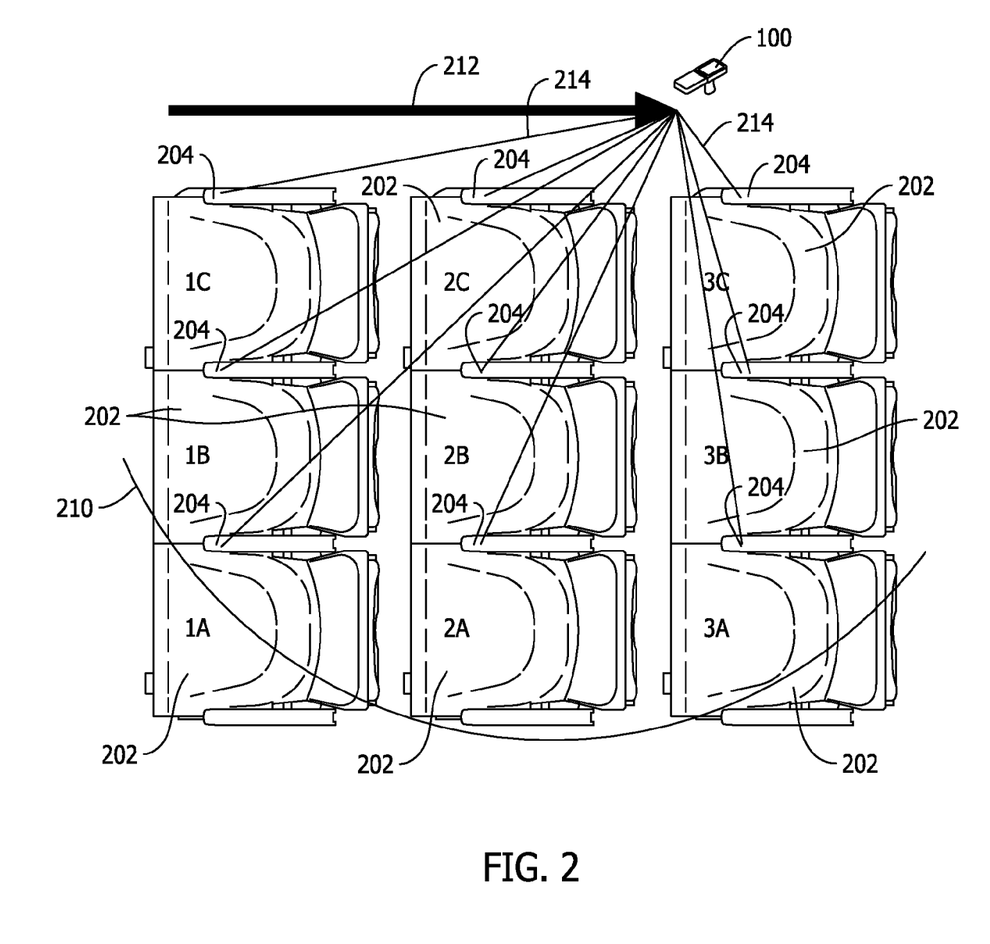
FIG. 2 is a schematic diagram illustrating operation of an omnidirectional scanner.

FIG. 2 is a schematic diagram illustrating operation of scanner 100. As shown in FIG. 2, an environment, such as an aircraft cabin, includes a plurality of seats 202. In FIG. 2, the environment includes nine seats 202 arranged in three rows of three seats 202 each. Alternatively, the environment may include any number of seats 202 arranged in any suitable configuration. Each seat 202 includes a control unit 204 (e.g., positioned in an arm rest). Further, each control unit 204 includes a passive RFID tag detectable by scanner 100. In this implementation, control unit 204 is located in the arm rest of seat 202. Alternatively, control unit 204 may be located somewhere else than on seat 202.

In the implementation shown in FIG. 2, scanner 100 is an omnidirectional scanner. Alternatively, scanner 100 may be a unidirectional scanner, as described in more detail below. Scanner 100 has an operating radius 210 within which scanner 100 can activate and detect passive RFID tags, such as those in control units 204. As scanner 100 is moved through the environment along a scanning path 212, using RFID detection, scanner 100 detects control units 204 and distances 214 between scanner 100 and control units 204. In general, the closer the control unit 204 is to scanner 100, the higher the detected signal strength. This data is collected over time, such that for a given control unit 204, the signal strength corresponding to distance 214 is recorded at multiple times (e.g., by time-stamping the measured signal strength). This recorded data for each data sample includes the signal strength associated with the RFID unique identifier, a time-stamp value, and the measured distance along the scanning path.

Figure 3:
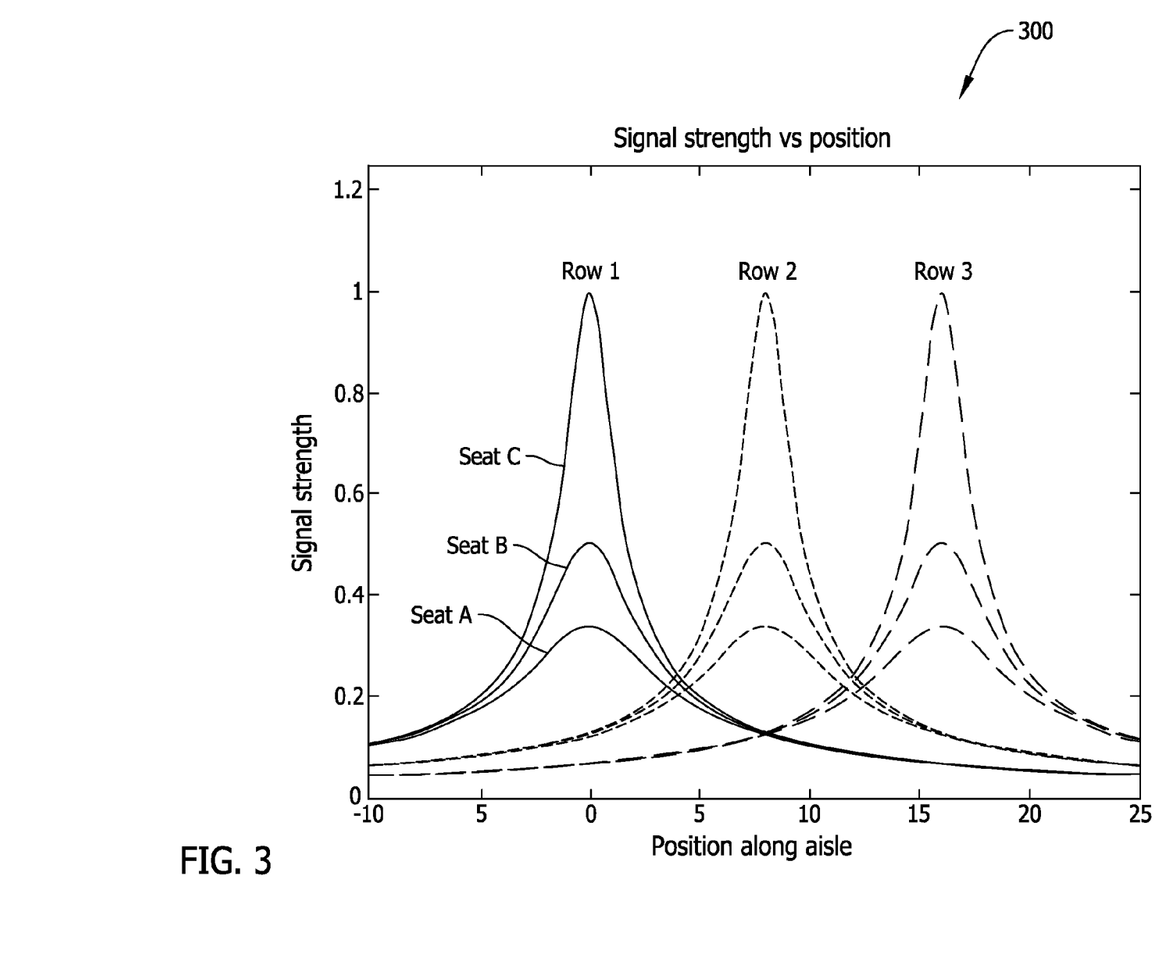
FIG. 3 is a graph showing simulated recorded signal strength for an omnidirectional signal scanner over time.

FIG. 3 is a graph 300 showing simulated recorded signal strength over time in an ideal scenario (i.e., without any signal noise). As shown in FIG. 3, signals associated with each seat 202 are clearly discernable. However, such a scenario is unlikely to occur in real-world conditions. That is, in real-world applications, the recorded signal strength will have significant signal noise, as well as multi-path reflections problems, making it difficult to determine which RFID tag (and associated control unit 204 and seat 202) corresponds to which signal.

Figure 4:
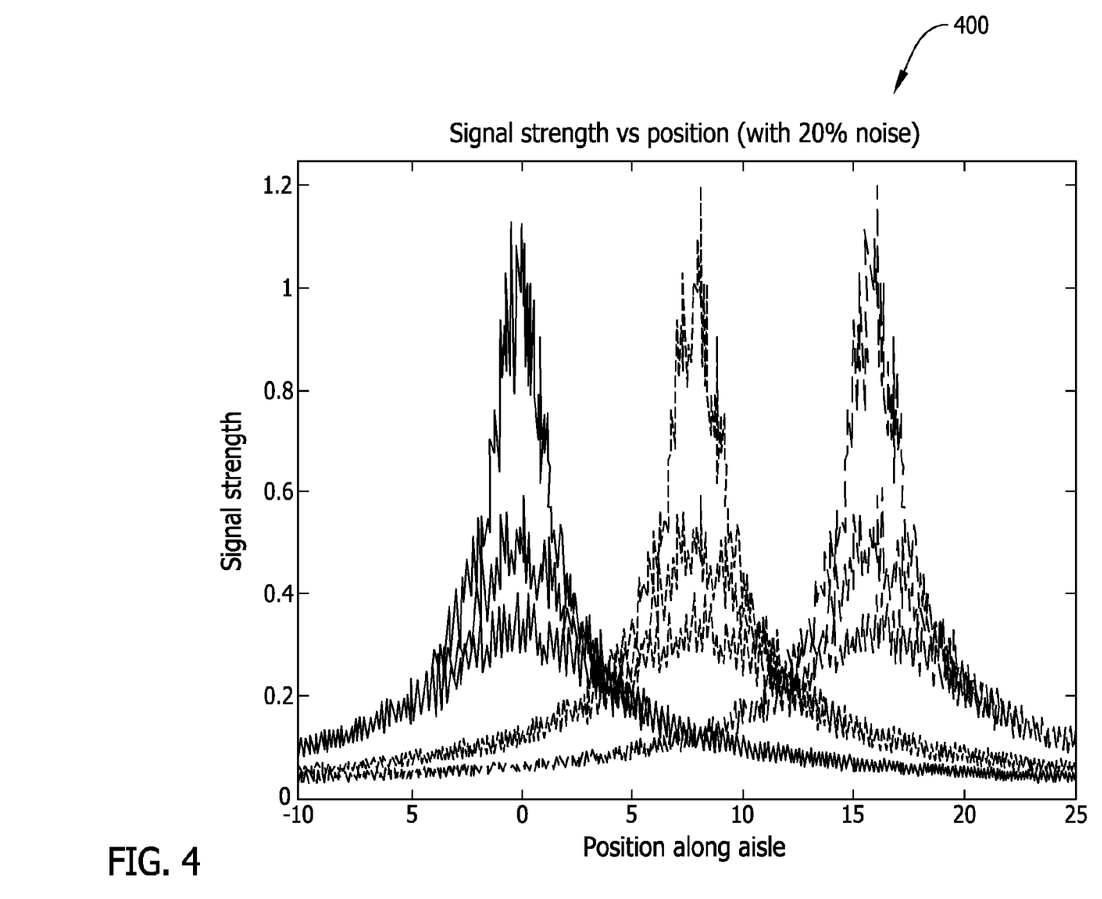
FIG. 4 is a graph showing simulated recorded signal strength for an omnidirectional signal scanner over time with signal noise taken into account.
Figure 5:
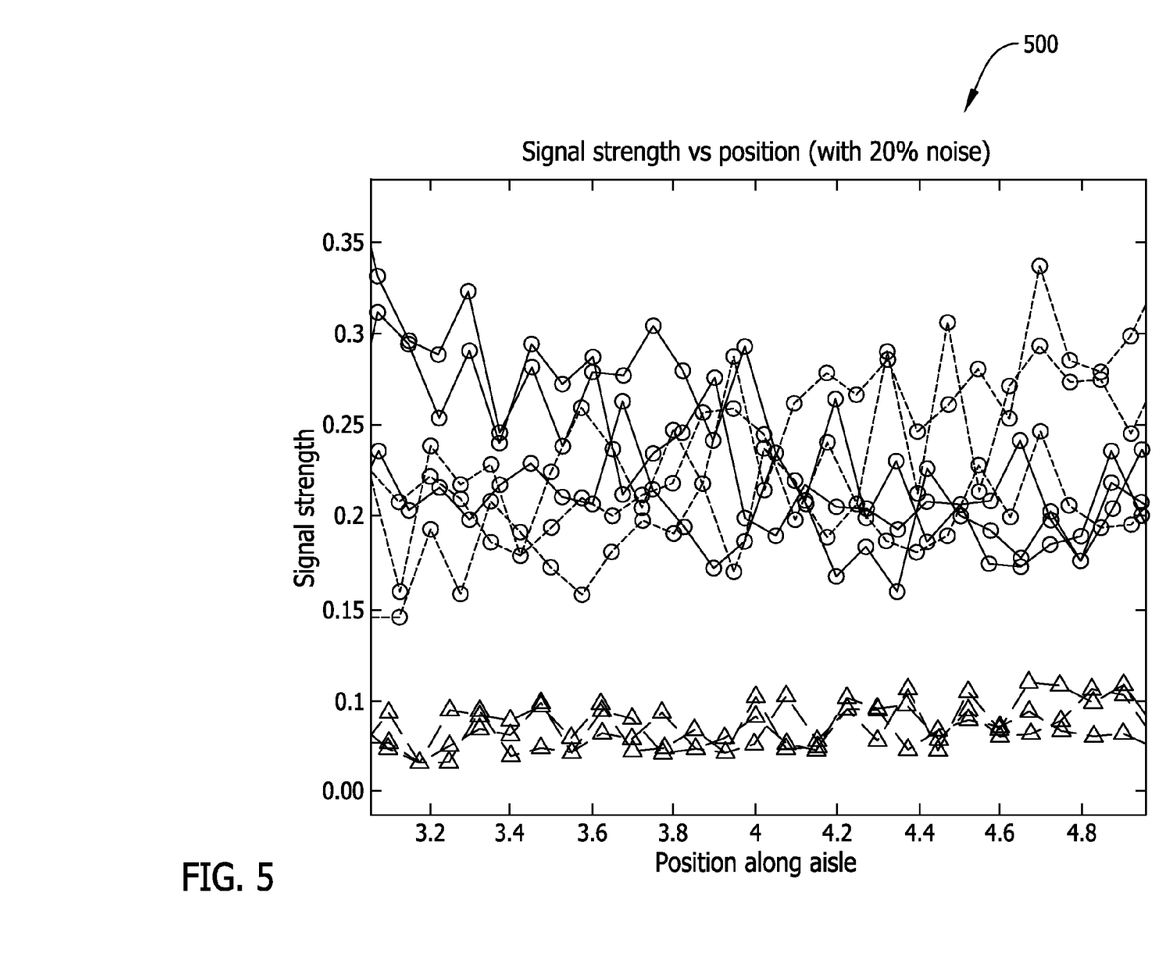
FIG. 5 is a portion of the graph shown in FIG. 4.

In contrast, FIG. 4 is a graph 400 showing simulated recorded signal strength over time with typical signal noise taken into account. FIG. 5 is a portion 500 of graph 400. As shown in FIGS. 4 and 5, the signals overlap with one another repeatedly, making it difficult to differentiate the signals from one another at a given point in time.

Accordingly, in the implementations described herein, signal strength data is collected and analyzed over time to identify periods of time where specific individuals signals may be extracted from the overlapping data from other signals. That is, by analyzing signal strength data over a larger time window, it is possible to filter the data to recover where peaks occur. As the individual peaks for each seat 202 are clearly distinguishable, even in FIG. 4, this allows the unique IDs associated with each RFID tag to be differentiated from one another.

Figure 6:
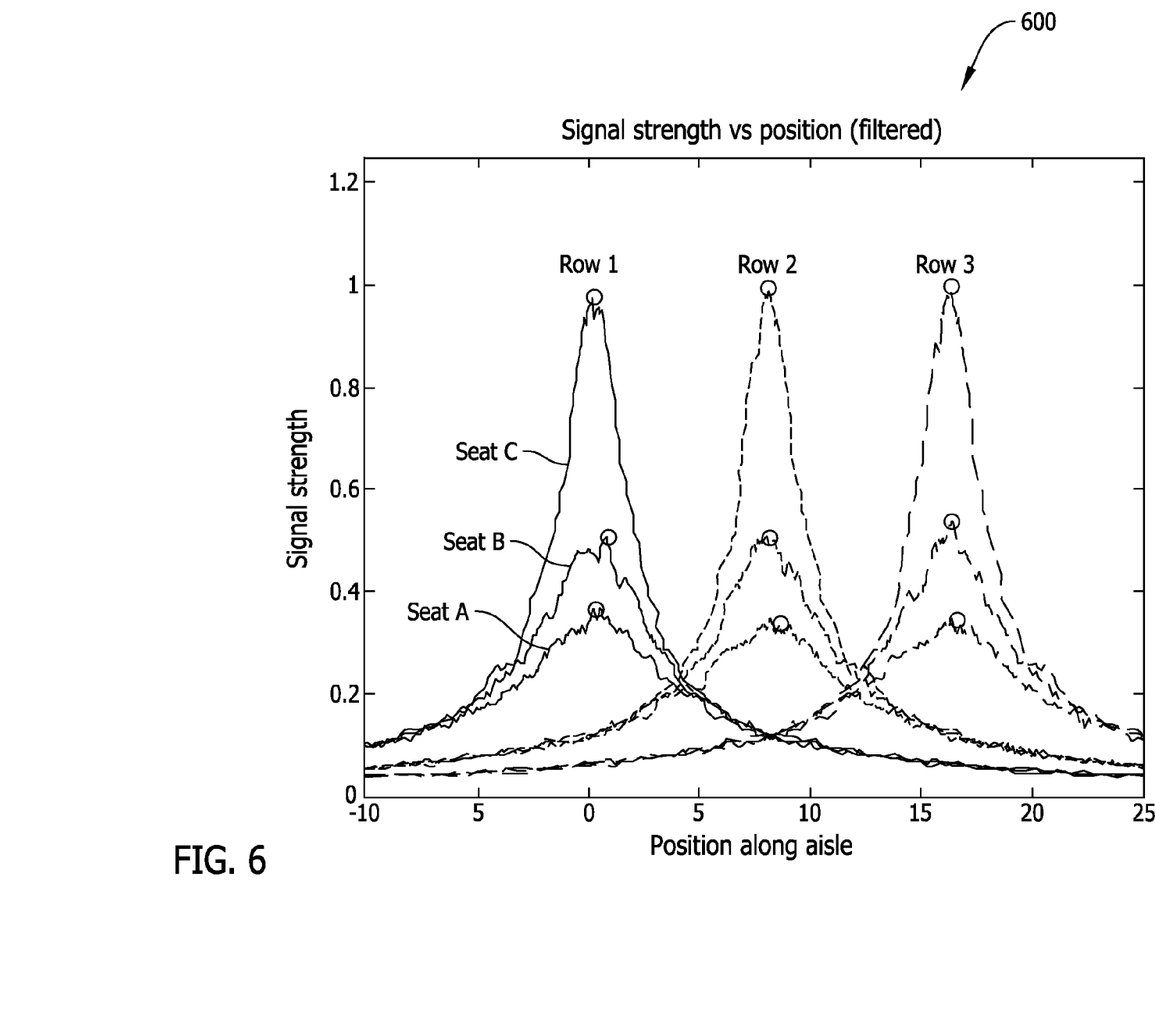
FIG. 6 is a graph showing recorded signal strength after filtering.

In the example implementation, the signal strength data is filtered using a complementary (i.e., fading memory) filter. Alternatively, the signal strength data may be filtered using any type of filter than enables scanner 100 to function as described herein. FIG. 6 is a graph 600 showing recorded signal strength after filtering. As shown in FIG. 6, the peaks of each signal may automatically be identified after filtering. Each seat 202 may then be associated with signal data in the region where the associated signal stands out from the others. As scanner 100 is moved along scanning path 212, signals for all RFID tags will be located and differentiated, but not all at the same time. It is important to recognize that this process does not require any prior knowledge of seat row location within the aircraft.

The identification method described above enables both a device automated pairing process and a real-time localization process. For example, for automated device pairing, a second set of signal strength curves may be similarly acquired for RFID-tagged objects (i.e., associated devices) that are to be paired with respective control units 204. Using a one-to-one pairing process, the objects are automatically paired with associated control units 204, and a data file including the list of pairings is automatically generated. For example, at a given location, the strongest control unit signal is paired with the strongest object signal, the second strongest control unit signal is paired with the second strongest object signal, etc.

The pairing of control units 204 and associated devices is recorded (e.g., in a memory device on scanner 100, or in a memory device of a remote computing device in communication with scanner 100). In the example implementation, each associated device may be paired with only one control unit 204. However, a single control unit 204 may be paired with multiple associated devices. After the pairing of control unit 204 with associated device is recorded, a data file may be generated that includes a set of paired unique IDs for each of control units 204 and associated devices, wherein the data file may be generated prior to connection of each of the plurality of control units 204 and associated devices to a communications network of the aircraft. Accordingly, an operational on-board network is not required for the pairing process. Of course, the pairing process may be performed after an on-board network is operational, but the network is not required.

The format of the data file may be an ASCII text file, a binary file, and/or any other type of data file format. In some implementations, the data file may be uploaded to a network control system that controls communications between the first and second pair members. The pairing data collected may be integrated with a graphical representation of the environment within which the scanning is being performed. This enables automatic generation of a pairing map. A successful pairing can then be shown on a graphics display (e.g., displayed on scanner 100). For example, pairing information may be displayed on a two-dimensional or three-dimensional graphical representation of an aircraft seat layout.

In some implementations, a portable computing device (e.g., a tablet or wearable computer device) is equipped with scanner 100, which may be detachable from the portable computing device (not shown). Information associated with the devices, such as successful pairings, may be displayed on the portable computing device. This pairing status information may also be displayed on the portable computing device in a proper registered 3D coordinate system of the aircraft. Further, portable computing device may include software that allows a user to modify the way successful (or unsuccessful) pairings are displayed (e.g., whether they are displayed in a textual or graphical form, the order in which the pairings are displayed, etc.).

The pairing data may be displayed to a user in multiple different formats, and may be displayed on scanner 100, a computing device communicatively coupled to scanner 100, and/or any other suitable display device. In one implementation, a three-dimensional model (e.g., of an aircraft interior) is displayed, with the pairing data overlaid on the three-dimensional model. This may assist the user in confirming locations of the paired objects in terms of a coordinate system (e.g., a coordinate system tied to seat numbers in the aircraft interior). Upon confirming the locations of the paired objects, and prior to connection of each of the paired objects to a communications network of the aircraft, a data file may be generated from the multiple sets of acquired paring data (where parings may in unique IDs for each control unit 204 and object). The data file of paired unique IDs is then uploaded (e.g., during the manufacture of the aircraft) to a network control system configured to control communications between the plurality of control units 204 and objects, where the data file uploaded such that a communication from the selected control units 204 will control the selected object. Accordingly, the data file of paired unique IDs may, for example, improve the process of manufacturing the aircraft by quickly and automatically generating a data file including pairing information prior to connection of each of the plurality of paired control units 204 and objects to a network.

The methods implemented using scanner 100 may also detect errors in the pairing process and generate corresponding alerts. For example, it may be determined whether, after the pairing process, one or more control units 204 with a detected RFID tag remain unpaired with an associated device. In another example, it may be determined whether more than one RFID tag is detected at the same location. By generating an appropriate visual, audible, and/or tactile alert, scanner 100 notifies a user, and the user can address the issue.

For real-time localization, a user may move scanner 100 through the environment until a set of peaks is detected. By comparing the detected peaks with the previously acquired data for all seats 202, the location of scanner 100 may be determined. When not at a signal peak, a location estimate may be computed by comparing the measured signal strength data to a mathematical model of the expected signal strength data. Moving scanner 100 away from those "peak" locations causes location determination to be less accurate, but the location can be updated when another seat of peaks is detected. This localization application addresses translational motion of scanner 100 down the aisle of the airplane, but may also be used as part of a six degrees-of-freedom localization application that determines both position and orientation. These localization techniques enable a user to quickly determine their location for applications related to inspection, quality control, and tours of the aircraft.

To address orientation, scanner 100 may be communicatively coupled to or include an inertial measurement unit (IMU). The IMU may be used to provide rotational data as well as an additional source of position data (by double integrating acceleration data). This additional data may be passed through a Kalman filter to improve determination of a location of scanner 100.

As discussed above, scanner 100 may be an omnidirectional scanner or a unidirectional scanner. As used herein, an omnidirectional scanner transmits and receives substantially equally in all angular directions, whereas a unidirectional scanner transmits and receives within a limited angular view. A unidirectional scanner may be used, for example, when transmission power is limited (e.g., due to environmental restriction or FCC regulations).

When scanner 100 is omnidirectional, RF energy is transmitted in all direction to energize the passive RFID tags in control units 204. Accordingly, the gain pattern is substantially spherical, extending in 360° in both vertical and horizontal planes. However, in order to energize RFID tags that are relatively far away, significantly more RF energy is needed than with a unidirectional scanner. Accordingly, some omnidirectional scanners may only have a range of a few inches, or less.

In contrast, unidirectional scanners may be capable of energizing and detecting passive RFID tags within a range of approximately fifteen feet. Accordingly, unidirectional scanners may be used to implement the methods described herein. For a unidirectional scanner, the gain pattern will have a substantially elliptical shape that extends from the scanner over a relatively limited angle. The width of the elliptical shape, or beam width, may differ between the horizontal and vertical profiles of the gain pattern. Accordingly, a unidirectional scanner transmits RF energy over a relatively narrow field-of-view, as compared to an omnidirectional scanner.

To use a unidirectional scanner in the methods described herein, in some implementations, scanner 100 may be placed on a motorized gimbal that oscillates through an elevation angle in a direction perpendicular to the direction of travel as scanner 100 moves down the aisle. Alternatively, in other implementations, an array of unidirectional multiple scanners configured in a fan-like arrangement could be used.

When using a unidirectional scanner, there may be gaps in the signal strength data when no RFID tags are detected in the narrower beam coverage region. However, gimbal rotation along a pan axis, along with IMU orientation, may be used to acquire data in this region, if desired. To allow for gimbal rotation and adequate data acquisition, a gimbaled unidirectional scanner may also need to be moved slower along scanning path 212 than an omnidirectional antenna. For an array of multiple unidirectional scanners, transmit/receive patterns may need to be adjusted (e.g., sequenced) for scanners adjacent to each other, in order to avoid return signal crosstalk.

Figure 7:
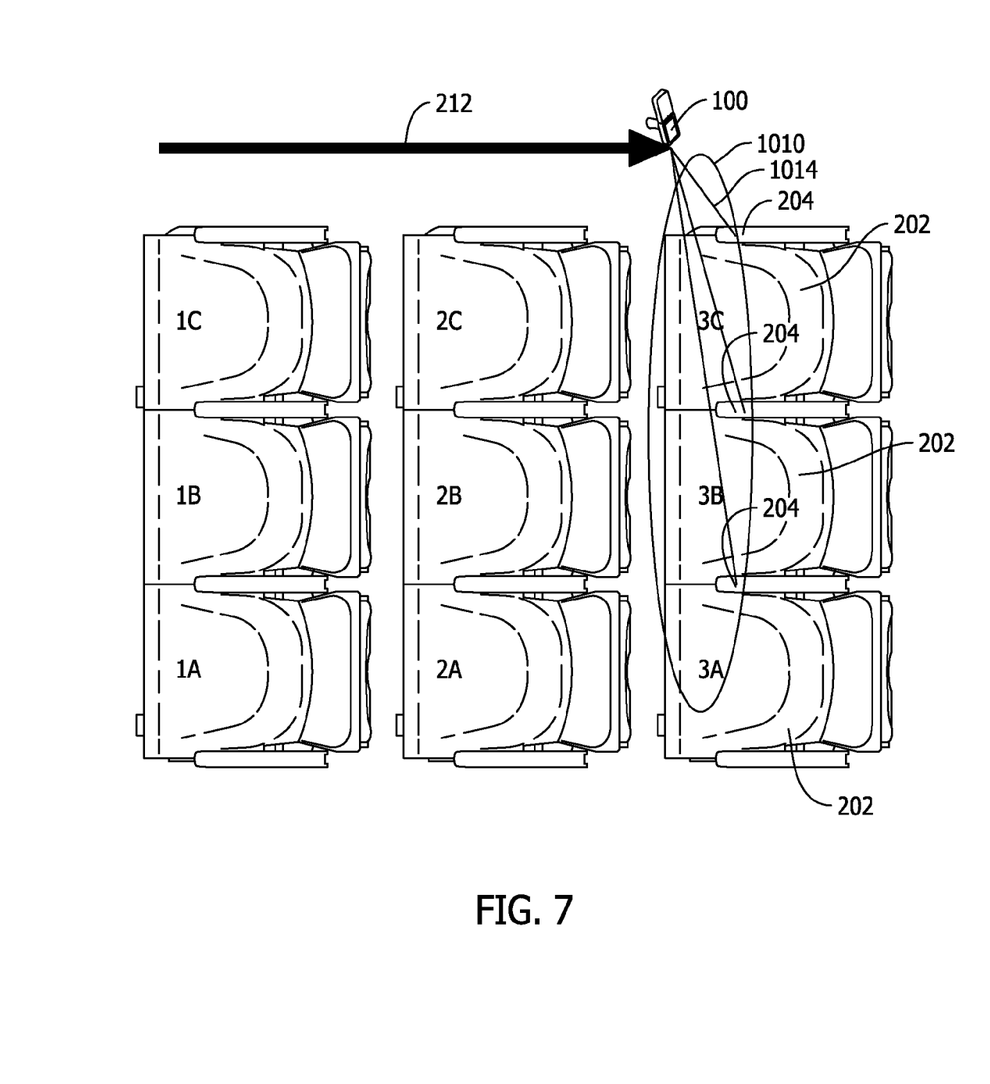
FIG. 7 is a schematic diagram illustrating operation of a unidirectional scanner.

FIG. 7 is a schematic diagram illustrating operation of scanner 100 when scanner 100 is a unidirectional scanner. Scanner 100 has an operating range 1010 within which scanner 100 can activate and detect passive RFID tags, such as those in control units 204. As scanner 100 is moved through the environment along a scanning path 212, using RFID detection, scanner 100 detects control units 204 and distances 1014 between scanner 100 and control units 204. The closer the control unit 204 is to scanner 100, the higher the detected signal strength. As shown in FIG. 7, the beam shape of a unidirectional scanner is much narrower than an omnidirectional scanner.

Figure 8:
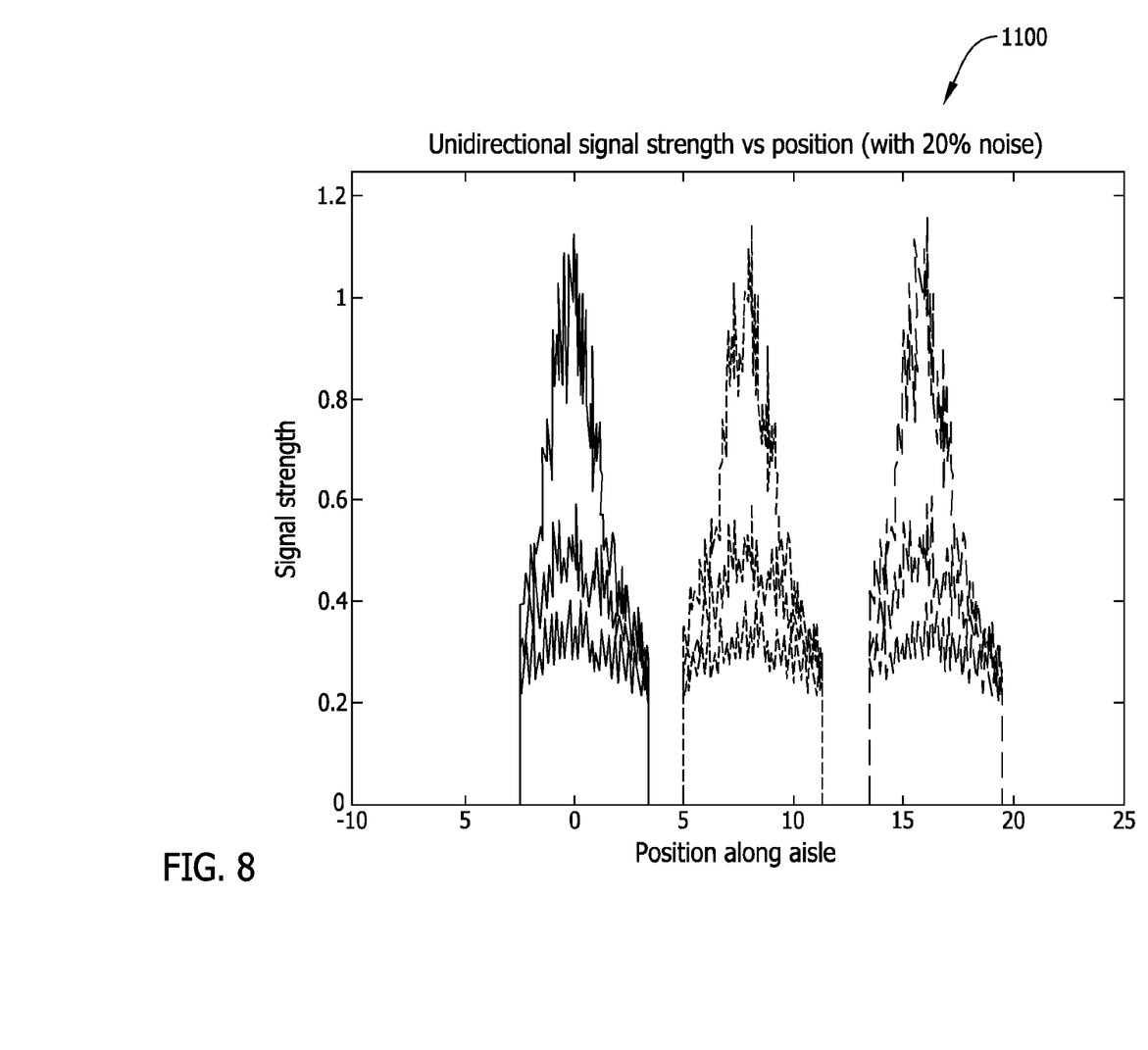
FIG. 8 is a graph showing simulated recorded signal strength for a unidirectional scanner over time with signal noise taken into account.
Figure 9:
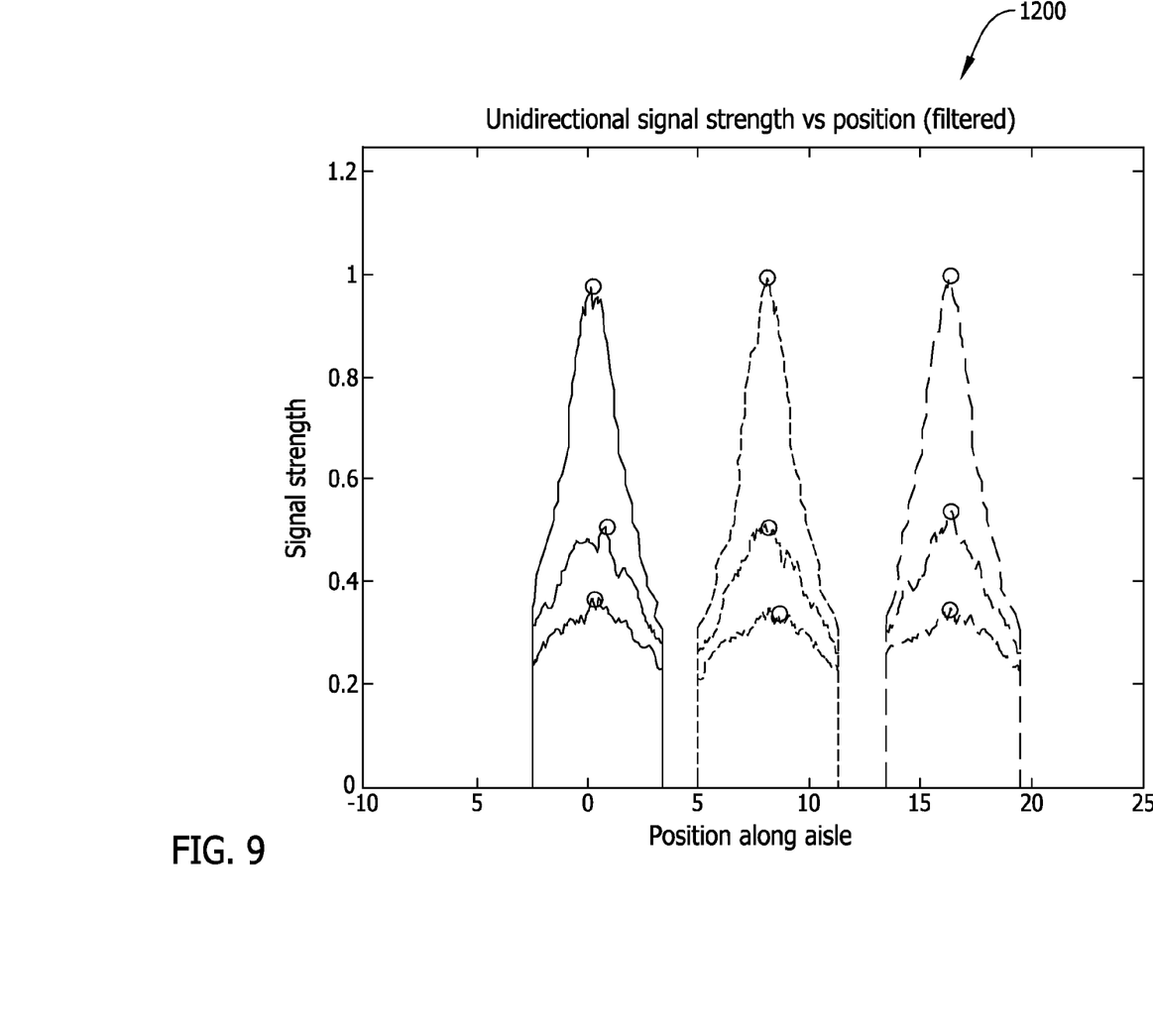
FIG. 9 is a graph showing recorded signal strength after filtering.

FIG. 8 is a graph 1100 showing simulated recorded signal strength over time using a unidirectional scanner and including signal noise. As shown in FIG. 8, because of the limited beam width, there are gaps in the data where no signal data was received. However, signal strength peaks can still be identified and discriminated using the methods described above in conjunction with an omnidirectional scanner, as shown in graph 1200 of FIG. 9. If multiple unidirectional scanners are used (e.g., in sequence), the orientation of the scanners may be determined, and seats on the left and right sides of the aisle may be differentiated from each other in a single pass.

Figure 10:
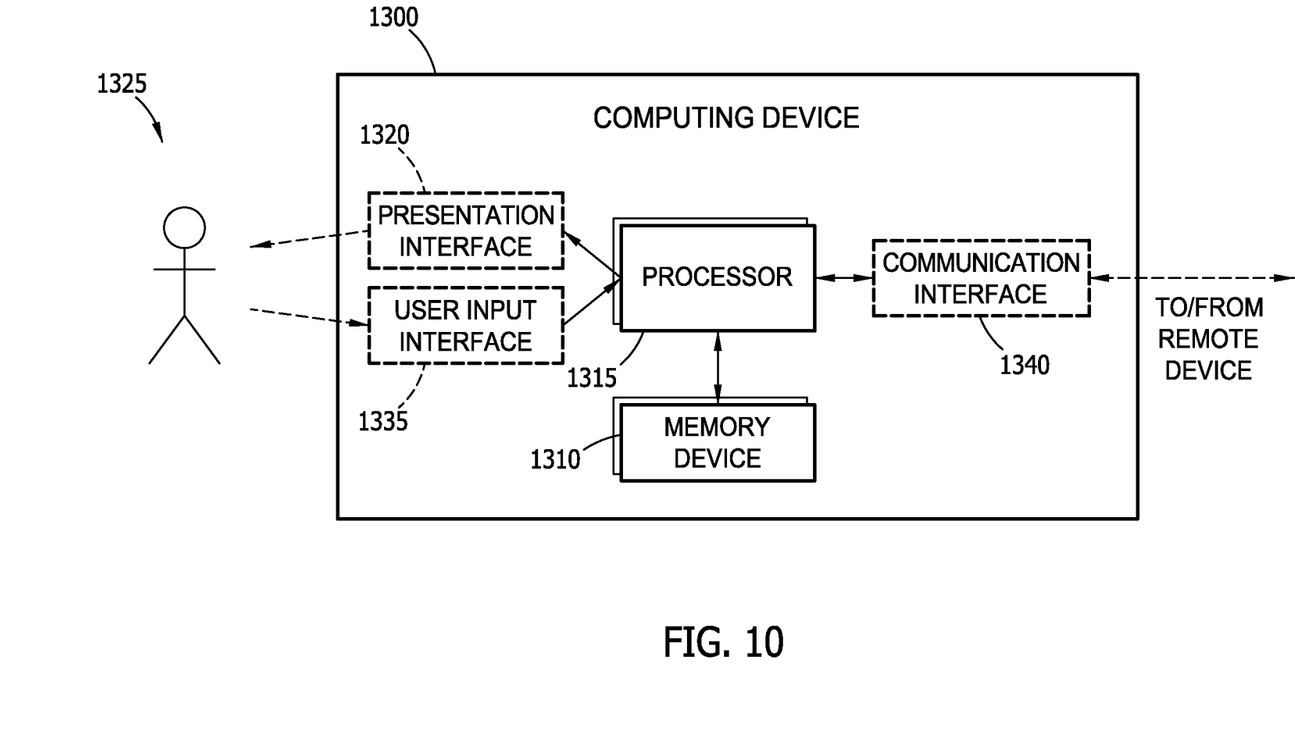
FIG. 10 is a block diagram of an example computing device that may be used with the scanner shown in FIG. 1.

FIG. 10 is a block diagram of a computing device 1300 that may be used to implement the methods described herein. For example, scanner 100 and/or a computing device in communication with scanner 100 may be implemented using computing device 1300. Computing device 1300 includes at least one memory device 1310 and a processor 1315 that is coupled to memory device 1310 for executing instructions. In some implementations, executable instructions are stored in memory device 1310. In the example implementation, computing device 1300 performs one or more operations described herein by programming processor 1315. For example, processor 1315 may be programmed by encoding an operation as one or more executable instructions and by providing the executable instructions in memory device 1310. In other implementations, scanner 100 may use a wireless network connection that allows the application software to be run remotely (i.e., performing processing at a location other than on scanner 100).

Processor 1315 may include one or more processing units (e.g., in a multi-core configuration). Further, processor 1315 may be implemented using one or more heterogeneous processor systems in which a main processor is present with secondary processors on a single chip. In another illustrative example, processor 1315 may be a symmetric multi-processor system containing multiple processors of the same type. Further, processor 1315 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the example implementation, memory device 1310 is one or more devices that enable information such as executable instructions and/or other data to be stored and retrieved. Memory device 1310 may include one or more computer readable media, such as, without limitation, dynamic random access memory (DRAM), static random access memory (SRAM), a solid state disk, and/or a hard disk. Memory device 1310 may be configured to store, without limitation, application source code, application object code, source code portions of interest, object code portions of interest, configuration data, execution events and/or any other type of data.

In the example implementation, computing device 1300 includes a presentation interface 1320 that is coupled to processor 1315. Presentation interface 1320 presents information to a user 1325. For example, presentation interface 1320 may include a display adapter (not shown) that may be coupled to a display device, such as a cathode ray tube (CRT), a liquid crystal display (LCD), an organic LED (OLED) display, and/or an "electronic ink" display. In some implementations, presentation interface 1320 includes one or more display devices.

In the example implementation, computing device 1300 includes a user input interface 1335. User input interface 1335 is coupled to processor 1315 and receives input from user 1325. User input interface 1335 may include, for example, a keyboard, a pointing device, a mouse, a stylus, a touch sensitive panel (e.g., a touch pad or a touch screen), a gyroscope, an accelerometer, a position detector, and/or an audio user input interface. For example, user input interface may be implemented as input interface 104 of scanner 100. A single component, such as a touch screen, may function as both a display device of presentation interface 1320 and user input interface 1335.

Computing device 1300, in the example implementation, includes a communication interface 1340 coupled to processor 1315. Communication interface 1340 communicates with one or more remote devices. To communicate with remote devices, communication interface 1340 may include, for example, a wired network adapter, a wireless network adapter, and/or a mobile telecommunications adapter.

As compared to at least some known pairing systems, the implementations described are significantly faster and easier for a human operator, and eliminate transcription errors. Further, the systems and methods described herein enable real-time, continuous positioning for interactive visualization or robotics applications. Eliminating of multiple steps of known processes, simplifying the pairing process, and removing potential sources of error will result in less time needed to collect pairing information, reducing costs. Further, relatively little training will be required for a user to operate the systems described herein. The user need only walk down the aisle of the airplane while carrying or pushing the scanning device. No manual entry is required. Moreover, additional automation is possible by using robotic vehicles to move the scanning device through the environment.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for electronically pairing a plurality of seat units with a plurality of controllable devices in an aircraft, said system comprising:
   a scanner movable relative to a plurality of seat units and a plurality of controllable devices each having RFID tags, said scanner configured to continuously scan and obtain a continuum of received signals from the RFID tags;
   a distance sensor configured to determine a relative position of said scanner over time as said scanner is moved;
   a filter configured to disregard outliers and smooth the continuum of received signals into respective sets of received signal data for each RFID tag, based on a unique ID in each received signal associated with each RFID tag, wherein each set of received signal data includes data points having the unique ID and a received signal strength, and wherein a relative time and a relative position are determined for each data point;
   a processor configured to:
      determine a relative location of each RFID tag, based on the relative position associated with a maximum received signal strength within the set of received signal data for each RFID tag; and
      generate a data file including pairings of seat units and associated controllable devices based on similar relative positions of RFID tags associated with each seat unit and each controllable device, the data file generated to enable respective seat units to operate associated controllable devices.

2. A system in accordance with claim 1, wherein said distance sensor is implemented within said scanner.

3. A system in accordance with claim 1, wherein said processor is configured to generate entries for the data file for each of the plurality of seat units and controllable devices regardless of the status of an on-board communications network for the aircraft.

4. A system in accordance with claim 1, wherein said processor is further configured to upload the data file to a network control system configured to control communications between the plurality of seat units and controllable devices.

5. A system in accordance with claim 1, wherein said processor is configured to generate a map of RFID tag locations within the aircraft based on the filtered continuum of received signals.

6. A system in accordance with claim 1, wherein said processor is configured to determine a position of said scanner based on the filtered continuum of received signals.

7. A system in accordance with claim 1, further comprising a cart supporting said scanner.

8. A system in accordance with claim 1, wherein said scanner is configured to be worn by a user.

9. A method for electronically pairing a plurality of seat units with a plurality of controllable devices in an aircraft, said method comprising:
   moving a scanner relative to a plurality of seat units and a plurality of controllable devices each having RFID tags to continuously scan and obtain a continuum of received signals from the RFID tags;

determining a relative position of the scanner over time as the scanner is moved;

filtering the continuum of received signals into respective sets of received signal data for each RFID tag, based on a unique ID in each received signal associated with each RFID tag, wherein each set of received signal data includes data points having the unique ID and a received signal strength, and wherein a relative time and a relative position are determined for each data point;

determining a relative location of each RFID tag, based on the relative position associated with a maximum received signal strength within the set of received signal data for each RFID tag; and generating a data file including pairings of seat units and associated controllable devices based on similar relative positions of RFID tags associated with each seat unit and each controllable device, the data file generated to enable respective seat units to operate associated controllable devices.

10. A method in accordance with claim 9, wherein generating a data file comprises generating a data file including a set of paired unique IDs for each of the plurality of seat units and controllable devices.

11. A method in accordance with claim 9, wherein generating a data file comprises generating entries for the data file for each of the plurality of seat units and controllable devices regardless of the status of an on-board communications network for the aircraft.

12. A method in accordance with claim 9, further comprising uploading the data file to a network control system configured to control communications between the plurality of seat units and controllable devices.

13. A method in accordance with claim 9, further comprising generating a map of RFID tag locations within the aircraft based on the filtered continuum of received signals.

14. A method in accordance with claim 9, further comprising determining a position of the scanner based on the filtered continuum of received signals.

15. A scanner for electronically pairing a plurality of seat units with a plurality of controllable devices in an aircraft, said scanner configured to:

continuously scan and obtain a continuum of received signals from RFID tags associated with a plurality of seat units and a plurality of controllable devices as said scanner is moved through the aircraft;

determine a relative position of said scanner over time as said scanner is moved;

filter the continuum of received signals into respective sets of received signal data for each RFID tag, based on a unique ID in each received signal associated with each RFID tag, wherein each set of received signal data includes data points having the unique ID and a received signal strength, and wherein a relative time and a relative position are determined for each data point;

determine a relative location of each RFID tag, based on the relative position associated with a maximum received signal strength within the set of received signal data for each RFID tag; and generate a data file including pairings of seat units and associated controllable devices based on similar relative positions of RFID tags associated with each seat unit and each controllable device, the data file generated to enable respective seat units to operate associated controllable devices.

16. A scanner in accordance with claim 15, wherein to generate a data file, said scanner is configured to generate a data file including a set of paired unique IDs for each of the plurality of seat units and controllable devices.

17. A scanner in accordance with claim 15, wherein to generate a data file, said scanner is configured to generate a data file prior to connection of each of the plurality of seat units and controllable devices to a communications network of the aircraft.

18. A scanner in accordance with claim 15, wherein said scanner is further configured to upload the data file to a network control system configured to control communications between the plurality of seat units and controllable devices.

19. A scanner in accordance with claim 15, wherein said scanner is further configured to generate a map of RFID tag locations within the aircraft based on the filtered continuum of received signals.

20. A scanner in accordance with claim 15, wherein said scanner is further configured to determine a position of said scanner based on the filtered continuum of received signals.

* * * * *